United States Patent

Dent

[11] Patent Number: 5,867,537
[45] Date of Patent: Feb. 2, 1999

[54] BALANCED TRANVERSAL I,Q FILTERS FOR QUADRATURE MODULATORS

[75] Inventor: Paul W. Dent, Stehag, Sweden

[73] Assignee: Ericsson Inc., Research Triangle Park, N.C.

[21] Appl. No.: 937,248

[22] Filed: Sep. 3, 1997

Related U.S. Application Data

[63] Continuation of Ser. No. 620,843, Mar. 20, 1996, abandoned, which is a continuation-in-part of Ser. No. 305,702, Sep. 14, 1994, Pat. No. 5,530,722, which is a continuation-in-part of Ser. No. 967,027, Oct. 27, 1992, Pat. No. 5,745,523.

[51] Int. Cl.$^6$ .................................................. H04L 27/36
[52] U.S. Cl. ................................ 375/298; 364/724.011
[58] Field of Search .................................... 370/206, 320, 370/342; 364/724.011, 724.012

[56] References Cited

U.S. PATENT DOCUMENTS

| | | | |
|---|---|---|---|
| 2,967,992 | 1/1961 | Scholten | 323/229 |
| 3,602,818 | 8/1971 | Anderlecht et al. | 455/72 |
| 3,906,166 | 9/1975 | Cooper et al. | 379/60 |
| 3,949,299 | 4/1976 | Song | 375/250 |
| 4,355,401 | 10/1982 | Ikoma et al. | 375/216 |
| 4,400,585 | 8/1983 | Kaman et al. | 379/63 |
| 4,455,676 | 6/1984 | Kaneda | 381/106 |
| 4,493,091 | 1/1985 | Gundry | 375/249 |
| 4,713,808 | 12/1987 | Gaskill et al. | 370/94.1 |
| 4,750,198 | 6/1988 | Harper | 379/59 |
| 4,825,448 | 4/1989 | Critchlow et al. | 375/222 |
| 4,835,792 | 5/1989 | Davarian | 375/324 |
| 4,850,033 | 7/1989 | Eizenhöfer et al. | 455/33.2 |
| 4,857,915 | 8/1989 | Andros et al. | 340/825.44 |
| 4,903,319 | 2/1990 | Kasai et al. | 455/33.2 |
| 4,903,320 | 2/1990 | Hanawa | 455/33.2 |
| 4,989,230 | 1/1991 | Gillig et al. | 379/59 |
| 4,996,696 | 2/1991 | McCabe | 375/249 |
| 5,008,925 | 4/1991 | Pireh | 379/60 |
| 5,020,076 | 5/1991 | Cahill et al. | 375/216 |
| 5,020,093 | 5/1991 | Pireh | 379/59 |
| 5,029,233 | 7/1991 | Metroka | 455/11.1 |
| 5,048,059 | 9/1991 | Dent | 375/340 |
| 5,068,818 | 11/1991 | Uramoto et al. | 364/734 |
| 5,079,550 | 1/1992 | Sooch et al. | 341/143 |
| 5,084,669 | 1/1992 | Dent | 324/76.82 |
| 5,119,397 | 6/1992 | Dahlin et al. | 375/216 |
| 5,124,703 | 6/1992 | Kaneaki et al. | 341/77 |
| 5,136,612 | 8/1992 | Bi | 375/200 |
| 5,150,362 | 9/1992 | Akerberg | 370/95.1 |

(List continued on next page.)

FOREIGN PATENT DOCUMENTS

| | | |
|---|---|---|
| 0 425 458 | 5/1991 | European Pat. Off. . |
| 0 426 560A1 | 5/1991 | European Pat. Off. . |
| 60-46139 | 3/1985 | Japan . |
| WO 93/14588 | 7/1993 | WIPO . |
| WO 96/08865 | 3/1996 | WIPO . |

OTHER PUBLICATIONS

J.K. Hinderling et al., "CDMA Mobile Station Modem ASIC," *IEEE Journal of Solid–State Circuits*, vol. 28, No. 3, Mar. 1993, New York, US, pp. 253–260.

(List continued on next page.)

*Primary Examiner*—Amanda Le
*Attorney, Agent, or Firm*—Burns, Doane, Swecker & Mathis, L.L.P.

[57] ABSTRACT

Radio transmissions are spectrally contained to reduce adjacent channel interference by a method and apparatus for I,Q filtering of signals before quadrature modulation in digital cellular radio transmission systems such as communications systems following the GSM TDMA, IS-54 or IS-95 standards. The filtering is accomplished by multiple stage registers connected at their complementary outputs to identical resistor networks. The outputs of the resistor networks are summed to represent a smoothly transitioning analog representation of the digital voice or data transmission. The analog representation may be additionally low pass filtered to remove higher frequency components before quadrature modulation. Because rapid transmissions in the transmittal signal are avoided, adjacent channel interference is reduced.

8 Claims, 4 Drawing Sheets

U.S. PATENT DOCUMENTS

| | | | |
|---|---|---|---|
| 5,163,159 | 11/1992 | Rich et al. | 455/74 |
| 5,189,593 | 2/1993 | Ooi | 455/195.1 |
| 5,220,275 | 6/1993 | Holmqvist | 324/76.82 |
| 5,243,346 | 9/1993 | Imani | 341/144 |
| 5,251,232 | 10/1993 | Nonami | 375/216 |
| 5,293,406 | 3/1994 | Suzuki | 375/295 |
| 5,530,722 | 6/1996 | Dent | 375/298 |
| 5,548,541 | 8/1996 | Bierman et al. | 375/308 X |

OTHER PUBLICATIONS

A. Yasuda et al., "A Small–Size Adder–Free π/4–Shift QPSK Signal Generator," IEEE 1995 Custom Integrated Circuits Conference, May 1, 1995, pp. 315–318.

F. Harris, "Implementing Waveform Shaping Filters to Pre–Equalize Gain and Phase Distortion of the Analog Signal Processing Path in DSP Based Modems," Proceedings of the Military Communications Conference, Oct. 2–5, 1994, New York, US, pp. 633–638.

Hongying Yan et al., "DSP Implementation of GFSK, GMSK and FQPSK Modulated Wireless Systems," *RF Design*, vol. 18, No. 6, Jun. 1, 1995, US, pp. 26–34.

Motorola, "DYNA T–A–C 6000X Universal Mobile Telephone", 1984.

IEEE Communications Magazine, "Trends in Cellular and Cordless Communications", D.J. Goodman, Jun. 1991, pp. 31–40.

Ericsson Review, "Introduction of Digital Cellular Systems in North America", F. Lindell and K. Raith, No. 2, 1990, vol. 67.

Global News, "Hughes Network Systems Jumps into the Cellular Arena with GM Backing", Feb. 1991, pp. 15–16.

"Audio compander squelches hiss and hum better than Dolby system", *electronics,* vol. 52, No. 4, Feb. 15, 1979, pp. 70, 72.

Tarallo et al., "Modulation Techniques for Digital Cellular Systems," 38th IEEE Veh. Tech. Conf., 1988, pp. 245–248.

R. Fisher, "Dual Mode Mobile Unit For Next Generation Digital Narrow Channel Cellular Telephone System," 38th IEEE Vehicular Tech. Conf., 1988, pp. 543–547.

Nobuaki Imai, et al., "An Extremely Accurate Quadrature Modulator IC Using Phase Detection Method and Its Application to Multilevel QAM Systems," *IEICE Transactions on Electronics,* vol. E75–C, No. 6 (Jun. 1992), pp. 674–682.

BALANCED TRANVERSAL I,Q FILTERS FOR QUADRATURE MODULATORS

This application is a continuation of application Ser. No. 08/620,843, filed Mar. 20, 1996, abandoned, which is a continuation-in-part of application Ser. No. 08/305,702, filed Sep. 14, 1994, now U.S. Pat. No. 5,530,722, which is a continuation-in-part of application Ser. No. 07/967,027, filed Oct. 27, 1992, now U.S. Pat. No. 5,745,523.

BACKGROUND OF THE INVENTION

1) Field of the Invention

The invention relates to methods and apparatuses for the realization of spectral containment of radio transmissions so that they do not cause adjacent channel interference and, in particular, for the realization of spectral containment of high bitrate digital transmissions such as TDMA or CDMA cellular telephone signals.

2) Discussion of Related Art

Technological advancements have permitted continuous improvements in reducing the size and cost while increasing the battery life of cellular portable telephones. This has made cellular telephones ever more popular. As a result, cellular telephone systems need to expand so as to provide service to ever greater numbers of subscribers.

Pressure on frequency channel availability has led to the development of digital cellular technologies such as the European GSM TDMA system, the U.S. IS-54 digital TDMA cellular standard, and the U.S. IS-95 CDMA standard. All the above systems are characterized by first converting speech to a compressed digital form which is then coded by more or less redundant coding and subsequently transmitted using one or more timeslots in a repeating frame period.

For example, the GSM TDMA system codes speech using convolutional coding and transmits the coded speech using one or two out of 16 timeslots depending on whether a half-rate or a full-rate channel is allocated. An IS-54 system also convolutionally codes speech and then transmits it using one or two out of six timeslots. An IS-95 system uses convolutional coding plus bit repetition and transmits the speech using 2, 4, 8 or 16 out of 16 timeslots depending on whether the speech sound is a voiced sound, non-voiced sound or silence/background noise. In all cases therefore, the bitrate of speech is first compressed to remove natural redundance and then the bitrate is increased by using intelligent coding to obtain a higher bitrate stream for transmission that is more tolerant of interference.

A transmitter for such digitally coded signals preferably comprises a balanced quadrature modulator. FIG. 1 illustrates a prior art arrangement of a quadrature modulator for synthesizing an arbitrarily modulated signal. A digital signal processor (DSP) 30 calculates time-spaced samples of the real and imaginary parts of a desired complex modulation. The real part is given by the desired amplitude times the cosine of the desired phase angle, while the imaginary part is given by the amplitude times the sine of the phase angle. In this way both Amplitude Modulated (AM) signals or Phase Modulated (PM) signals can be generated, or signals comprising both, the result of which is generally known as complex modulated signals. The numerical samples calculated by the DSP 30 are transferred to a pair of Digital-to-Analog (D-to-A) convertors 31 that convert each numerical sample pair into a pair of analog voltages known as I (In-phase) and Q (Quadrature) signals. A sequence of such numerical samples generates I and Q waveforms but in a stepwise fashion.

The steps in the waveforms cause undesirable spectral components that would interfere with adjacent radio channels unless suppressed. Some techniques for D-to-A conversion provide interpolation between samples giving sloping waveforms between adjacent sample values, which reduces but does not sufficiently eliminate the undesired components. Consequently, I and Q smoothing filters 32 are necessary. These are low-pass filters that pass all modulation spectral components of interest but suppress the higher frequency components of the spectrum associated with the stepwise or piecewise linear I,Q waveforms from the D-to-A convertors 31.

The smoothed I,Q waveforms are applied to a pair of balanced modulators 33 together with cosine and sine carrier frequency signals, this arrangement being known as a quadrature modulator. The arrangement described so far and illustrated in FIG. 1 belongs to the well-known prior art.

In summary, the DSP 30 produces numerical I and Q waveforms representative of the desired digital or analog modulation and then D-to-A convertors 31 convert the numerical I,Q representations to analog I,Q modulating waveforms. Filters 32 remove discontinuities due to the finite time sampling and quantization of the numerical I,Q signals to produce continuous I,Q waveforms, thus avoiding spectral splatter into adjacent radio channels. The smoothed I,Q waveforms are applied to sine and cosine radio frequency-carriers using quadrature modulator 33.

It is important for accurate signal generation that (1) the two balanced modulators are accurately matched, (2) the levels of the I and Q signals are accurately controlled relative to each other, and (3) the balanced modulators have low carrier leakage or offset, that is, the output signal of a balanced modulator should be zero when its respective I or Q modulating signal is zero.

Since the I and Q signals vary from positive to negative, if a circuit is required to operate only from a single positive supply, then the zero point of an I or Q waveform cannot be defined to be zero voltage, but must be defined to be some positive reference voltage such as half the supply voltage. Then when an I or Q waveform swings below this reference voltage it will be interpreted as negative, and positive when it swings above.

Unfortunately, it is difficult to generate a reference voltage from the DSP 30 that is exactly equal to the voltage the D-to-A convertors supply with an input numerical value of zero. This problem is overcome by use of the balanced configuration shown in FIG. 2 and disclosed in U.S. Pat. No. 5,530,722, herein incorporated by reference, which uses special D-to-A conversion techniques to generate I and Q signals as well as their complements I and Q.

In FIG. 2, instead of using the D-to-A convertors 31 of FIG. 1, the numerical I and Q signals from DSP 30 are transferred to a delta-sigma (Δ-Σ) convertor 41. This device is built according to known art to generate a high bitrate stream of binary '1's and '0's having a short-term average value proportional to the numerical input value. With a maximum possible numerical input value the bit stream produced would be 1111 . . . (the voltage of a '1' condition being equal to the chosen supply voltage) while the minimum numerical input value will generate the bit pattern 00000 . . . A half-scale numerical input will produce the bit stream 1010101010 . . . having an average voltage equal to half the supply voltage. According to an aspect of the invention disclosed in U.S. Pat. No. 5,539,722, extra invertor gates 42 are provided at the output of each delta-sigma convertor 41 to additionally generate the complementary bitstreams. That means when delta-sigma convertors 41 produce a bit stream 100100100100 . . . having a mean of ⅓ the supply voltage, the complementary bit stream will be 011011011011 . . . having a mean of ⅔rds the supply voltage. The difference between these two is ⅓−⅔=−⅓ of the supply voltage. If the convertor produces 111011101110 . . . having a mean of +¾ of the supply voltage then the complementary signal 000100010001 . . . will have the mean of ¼ of the supply voltage, so that the difference is ¾−¼=+½ of the supply voltage. Consequently, by using the difference between the convertor output signal and its complement to represent an I or Q signal, the value represented can be positive or negative even with a single positive voltage supply, and no reference voltage need be generated. The balanced mixers 43 are therefor provided with balanced, two-wire inputs rather than single-ended inputs, that are responsive to the difference in the signals on the two wires and unresponsive to the absolute or common-mode voltage (sum of the voltages) on the two wires.

High bitrate delta-sigma modulation bitstreams are simply converted to the analog voltage they represent by forming the moving average voltage over a large number of bits. This may be done using a continuous-time, low-pass filter having a bandwidth which is a small fraction of the bitrate, but still sufficient to pass all desired modulation components. For the balanced signal configuration developed in this invention, balanced filters 44 are interposed between the delta-sigma convertor outputs and the I,Q balanced modulators 43.

In summary, delta-sigma convertors 41 convert the numerical sample values from DSP 30 to high bitrate streams wherein instantaneous waveform values are represented by the proportion of ones to zeros in the bitstream, i.e., by the average mark/space ratio. The inverters 42 form complementary bitstreams such that the difference in mark space ratio forms a balanced signal that can more easily represent both positive and negative instantaneous waveform values. The high bitrate fluctuations are removed by balanced filters 44 to obtain continuous, smoothed I,Q waveforms which are applied to balanced inputs of quadrature modulator 43, as disclosed in U.S. Pat. No. 5,530,722, which is a continuation-in-part of U.S. patent application Ser. No. 07/967,027, now U.S. Pat. No. 5,745,523 which is also incorporated herein by reference. The parent applications disclose the advantages of using balanced I,Q signals representing a complex modulating signal waveform by means of high bitrate sigma-delta modulation streams and their complements.

SUMMARY OF THE INVENTION

The present application discloses the use of the inventive schemes for CDMA transmissions and discloses an advantageous balanced filter that may be constructed on a digital integrated circuit.

A signal to be transmitted is formed initially as a pair of complex baseband signals comprising an I-signal and a Q-signal. The I and Q signals can be represented by high bitrate sigma-delta modulation in which each bit is either a zero or a one. An I stream, a Q stream and their complements are preferably used to form a balanced I signal and a balanced Q signal each on a pair of wires. A CDMA signal can likewise be represented by a stream of high bitrate I-chips and a stream of high bitrate Q-chips, and their complements. The CDMA I and Q signals may furthermore be sampled at a multiple of, e.g., four times, the chiprate giving four bits per chip of balanced I and balanced Q signals.

The balanced I and Q signals are delayed in a chain of shift register stages clocked at at least the bitrate to produce delayed balanced I,Q signals at respective q and $\bar{q}$ outputs of each of the shift register stages.

A first resistor network comprising resistors of different values representing transversal filter weights is connected to the I outputs of the shift register, the q outputs being used for a positive weight and the $\bar{q}$ outputs for a negative weight. Each shift register output connects to one end of a respective weighting resistor while the other resistor ends are summed to provide a first filtered output. A second identical resistor network connects to the q and $\bar{q}$ outputs not used by the first network to provide a complementary output. Identical first and second resistor networks are likewise connected to the q and $\bar{q}$ outputs of the Q shift register to provide complementary filtered Q outputs.

The balanced I and Q filtered outputs can be further connected to a balanced resistor-capacitor filter to remove unwanted high-frequency components. The RC-filtered balanced signals are then connected to an I,Q modulator (quadrature modulator) to modulate a radio frequency signal such that unwanted emissions in adjacent channels are reduced.

The inventive balanced I,Q transversal filter may be constructed entirely on a semiconductor substrate as an integrated circuit. The desired filtering function is determined by resistor ratios and not absolute values making it suitable for production in processes where absolute resistor values are not able to be tightly controlled but resistor ratios are determined by geometry and thus are more tightly controlled.

BRIEF DESCRIPTION OF THE DRAWINGS

The invention will now be described with reference to the exemplary embodiments shown in the accompanying drawings in which.

DETAILED DESCRIPTION OF EMBODIMENTS OF THE PRESENT INVENTION

Figure 1:
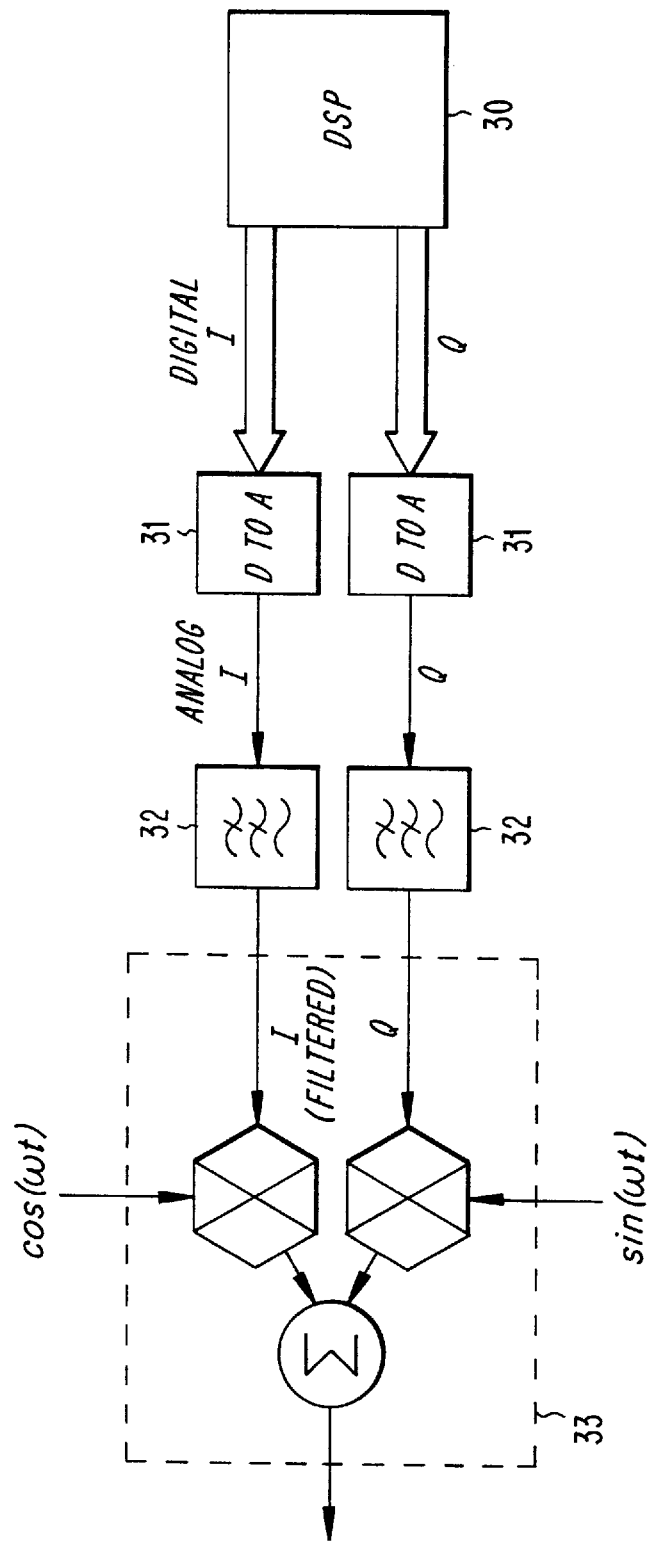
FIG. 1 is a schematic diagram of a conventional art I,Q modulator circuit.
Figure 2:
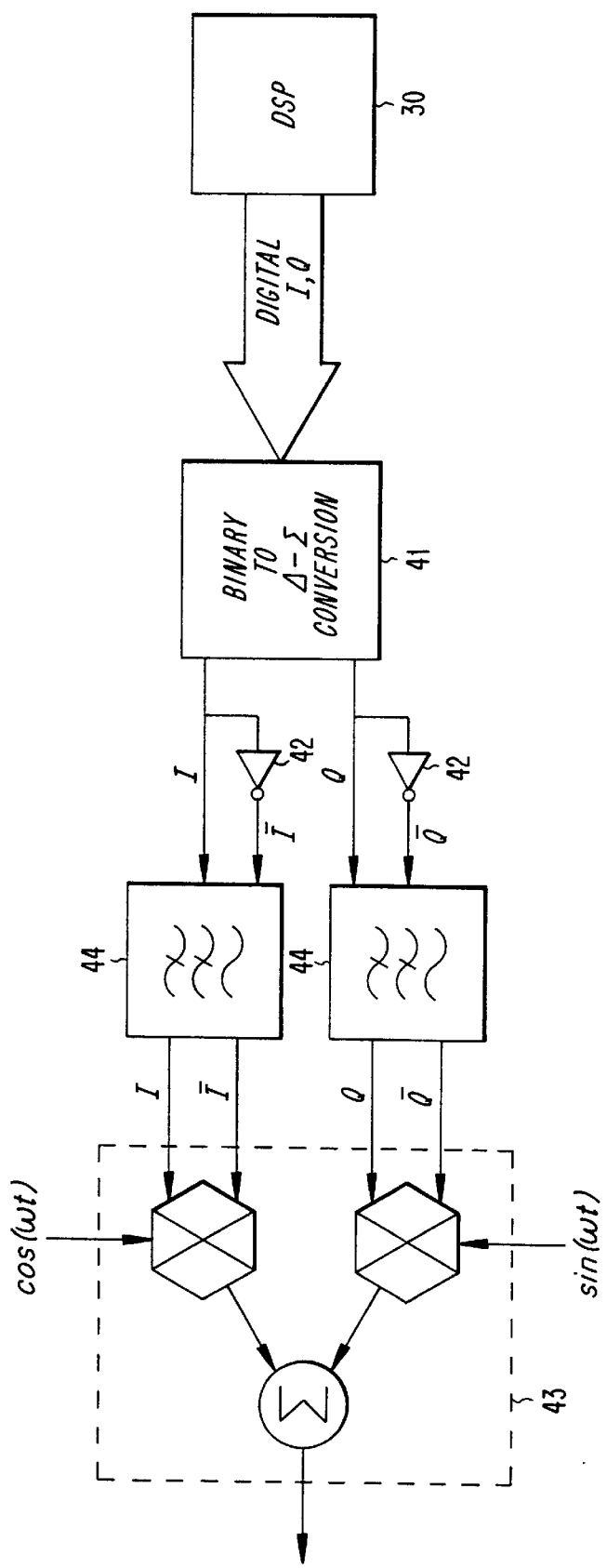
FIG. 2 is a schematic diagram of an inventive I,Q modulator circuit as disclosed herein and in parent application Ser. No. 08/305,702, now U.S. Pat. No. 5,530,772.
Figure 3:
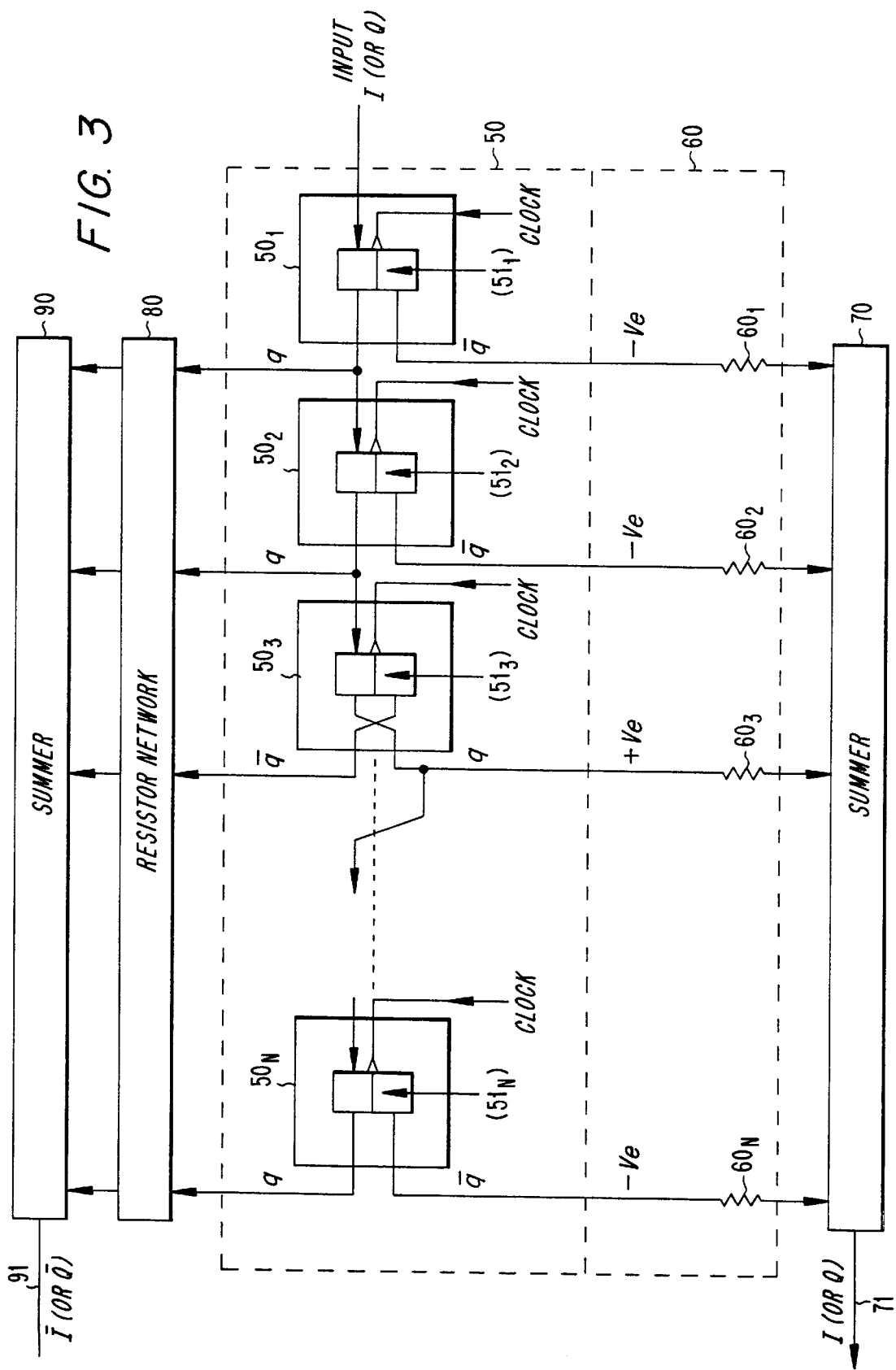
FIG. 3 is a schematic diagram of an I,Q filtering circuit in accordance with the present invention.

FIG. 3 shows an inventive alternative to the combination of the inverters 42 and the balanced filters 44 of FIG. 2 for realizing a balanced filter.

An I bitstream or a Q bitstream from delta-sigma convertors 41 is applied to a filter 30 constructed broadly according to FIG. 3, i.e., there is one filter 30 for each of the I and Q bitstreams. In other words, one of the balanced transversal filters of FIG. 3 is used for the I-signals, and another one for the Q-signals.

The I or Q bitstream enters a shift register 50 which is in the form of a chain of shift register stages ($50_1$, $50_2$, . . . $50_N$) each comprising a flip-flop ($51_1$, $51_2$, . . . $51_N$) having q and $\bar{q}$ complementary outputs. A resistor network 60 consisting of a group of resistors ($60_1$, $60_2$ . . . $60_N$) of different values $R_1, R_2, \ldots R_N$ are connected to the flip-flop outputs using the q output to obtain a positive weighting value or the $\bar{q}$ output, as shown at shift register stage $50_3$, if a negative weighting value is desired. How the weights are determined is explained below. The other ends of the resistors are connected to a summer 70 which may be simply a summing junction 71. An identical set of resistors 80 connects to the flip flop q-outputs where the first network connects to the $\bar{q}$ outputs and vice-versa, such that the waveform produced at the summer 90 or summing junction 91 of the second resistor network 80 is complementary to the first waveform at the summer 70 or summing junction 71 of the first resistor network 60.

In a system following the current GSM standard, a 13 MHz reference clock is used as the reference for all bitrates and frequencies. The transmitted bitrate is 13 MHz/48. Using 13 MHz as the delta-sigma bitrate output from delta-sigma convertors 41 means that 48 delta-sigma bit outputs will occur per transmitted bit period. Shift register 50 can thus conveniently be 48 bits long and the resistors $60_1$–$60_{48}$ ("N" in this instance being equal to 48) chosen to obtain a desired impulse response with a duration of one bit period. This impulse response corresponds to a frequency response bandwidth of the order of the bitrate or a few times the bitrate. This frequency response represents only the filtering needed to remove delta-sigma noise, the waveform shaping of the transmitted symbol transitions being determined by the DSP 30 in conjunction with the delta-sigma convertor 41. For example, the delta-sigma convertor 31 can comprise a Read Only Memory (ROM) containing 8 precomputed 48-bit patterns of I and Q waveforms corresponding to all possible patterns of three consecutive information bits.

Generally, I,Q waveforms can be created for digital transmitters by means of such a ROM modulator, which relies on being able to truncate the impulse response of the premodulation filter to a reasonable number of bit periods M, where $2^M$ gives a ROM of a reasonable size. Using the truncated impulse response, the filter can produce, over each bit interval, one of a finite number, $2^M$, of possible waveforms. By storing each I,Q waveform at an adequate number of samples per bit in a ROM, the modulation and filtering is achieved simply by feeding the data stream through an M-bit shift register (not shown) which addresses the ROM to output waveforms for that bit interval. Each waveform then has an impulse response length which can be up to three information bit periods long, as compared to the one bit period of the filter of FIG. 3 with 48 stages. This provides advantages for the following reasons. The sharpness of cut-off of a filter response in the frequency domain increases in proportion to the lengths of its impulse response in the time domain. Thus, a long impulse response is desirable to obtain a sharp filtering effect in the frequency domain. Desirable impulse responses are generally several information symbols in length, e.g., 3 symbol periods. The sharpness of cut-off is determined by the number symbols each waveform stored in the ROM modulator depends on, while attenuation of components further away from the cut-off point depends on the filtering applied to these delta-sigma waveforms after they emerge from the ROM modulator.

Figure 4:
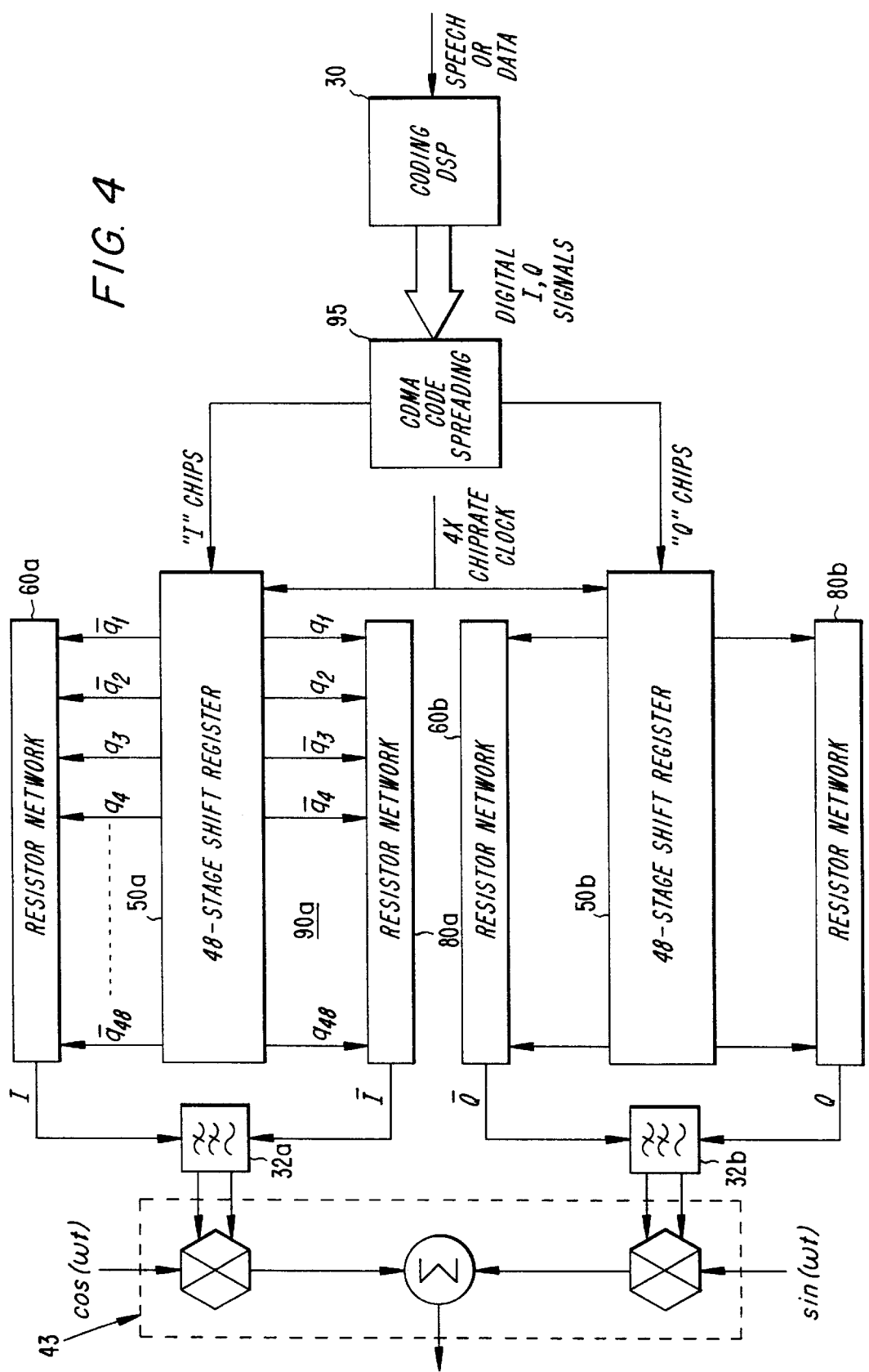
FIG. 4 is a schematic diagram of an I,Q filtering circuit in accordance with the present invention as applied to CDMA transmission.

The filter of FIG. 3 may also be used for generating a filtered, CDMA coded signal, as shown in FIG. 4. The DSP 30 supplies convolutionally-coded and interleaved information bits to convertors 41, which are now CDMA code-spreaders 95 instead of the delta-sigma convertors. For example, if the CDMA spreading spreads each coded bit from DSP 30 by a factor of 64, the output chip rate from spreaders 95 will be 64 times the coded information rate, giving in the case of CDMA standard IS-95 a chiprate of 1.2288 Megabits/sec. This chip stream can be used as an input for the filter of FIG. 3. The chip stream may be further sampled at four samples per chip to obtain a rate of 4.9152 Megabits/sec which is clocked into a shift register 50 of, for example, 48 stages. The total impulse response length of 48 ¼-chips or 12 chips is adequate to allow, by proper choice of weighting resistors $60_1$–$60_N$, good spectral containment of transmissions.

More specifically, FIG. 4 illustrates the application of the present invention to a CDMA system in which the DSP 30 codes analog speech into digital form or accepts digital data signals already in digital form and applies error correction coding. The coded speech and data are then converted to I,Q signals representing the vector components of a modulated signal which are further spread-spectrum coded by the code spreading unit 95 to obtain high bitrate I and Q chipstreams. The I,Q chipstreams are clocked through shift register stages 50a, 50b at a multiple of (for example, four times) the chiprate and the inverted $\bar{q}$ or non-inverted q outputs of the shift registers are applied to resistor networks 60a, 60b with the inverse being applied to other resistor networks 80a, 80b. As a result, the first resistor networks 60a, 80a generate antiphase I-signals forming a balanced signal input to a first balanced RC filter 32a and second resistor networks 60b, 80b form balanced Q-signal outputs to a second balanced RC filter 32b. Filters 32a, 32b have only to remove unwanted spectral components above the sampling frequency (of four times the chiprate) and can be integrated RC filters, the main filter frequency response in the vicinity of the chiprate having been accurately determined by the resistor ratios within weighting networks 60a, 60b, 80a, 80b. The filtered, balanced I,Q drive signals from filters 32a, 32b are then applied to the balanced inputs of quadrature modulator 43.

Thus, it has been shown above how the inventive balanced quadrature modulator may be used advantageously to generate CDMA signals for transmission that have been accurately filtered by balanced transversal filters using resistive weights. It is well known in the prior art that the weighting values of a transversal filter should follow the coefficients of an inverse Fourier Transform of the desired frequency response. Accordingly, the resistor values $60_1$, $60_2$ ... $60_N$ should be inversely proportional to the Fourier transform of the desired frequency response. This is also equivalent to choosing the weighting resistor values to be inversely proportional to samples on the desired filter impulse response. Since the network is of finite length, knowledge available within the prior art may be consulted as to how best to truncate the infinite impulse response of an ideal band limiting filter to obtain modified weighting values that compensate for the truncation while continuing to provide increasing attenuation of out-of-band, unwanted spectral components of the I,Q modulating waveforms.

The invention of FIGS. 3 and 4 is amenable to integration in the form of a semiconductor (e.g., silicon) chip. Semiconductor chip processes have various means for forming resistors. The absolute values of such resistors are hard to control accurately, but an advantage of the invention is that only the ratios of the resistors are of prime importance, and the absolute values are of secondary importance, affecting only the power consumption of the circuit rather than the filter frequency response. To minimize power consumption, the resistors should be of high value; high value resistors may be fabricated in a CMOS process for example as long, N-type FETs that are biassed to the ON condition by connecting their gates to the positive supply. The resistor values are proportional then to the total gate length.

Other process steps such as polysilicon or diffusion steps may be used to fabricate transversal filter weighting resistors, and other modulations than those described may be reduced to the formation of suitable I,Q signals and filtered and quadrature modulated according to the invention. All such variations and applications are considered to fall within the spirit and scope of the invention as described by the following claims.

I claim:

1. A quadrature modulator for impressing a desired modulation on a radio signal, comprising:

digital signal processing means for forming an I-signal and a Q-signal representative of a desired radio signal modulation, said I and Q signals each assuming only a single signal value or its complementary value at successive intervals of a sampling clock;

first (I) and second (Q) shift register means for clocking said I and Q signals respectively into a chain of register stages using said sampling clock and producing from each stage a delayed I or Q output and its logical inverse complementary output;

first weighting means connected to selected I-outputs or their complementary outputs of said first (I) shift register and a second, identical weighting means connected to the opposite outputs not selected by said first weighting means, said first and second weighting means producing first and second weighted output signals;

third weighting means connected to selected Q-outputs or their complementary outputs of said first (Q) shift register and a fourth, identical weighting means connected to the opposite outputs not selected by said third weighting means, said third and fourth weighting means producing third and fourth weighted output signals; and quadrature modulating means having inputs for receiving said first through fourth weighted output signals for impressing said desired modulation on a radio frequency carrier signal.

2. A quadrature modulator according to claim 1, further comprising:

first smoothing means for smoothing said first and second weighted output signals to produce a first smoothed, balanced signal output; and second smoothing means for smoothing said third and fourth weighted output signals to produce a second smoothed, balanced signal output, wherein said quadrature modulating means has first and second balanced inputs connected respectively to said first and second balanced signal outputs for impressing said desired modulation on a radio frequency carrier signal.

3. A code division multiple access spread-spectrum signal transmitter comprising:

digital signal processing means for coding a speech or data signal for transmission into a digital signal;

spread-spectrum coding means for converting said digital signal to an 'I' chipstream and a 'Q' chipstream at a given chiprate, said chipstreams comprising sequences of signal values or their complements;

first (I) and second (Q) shift register means for clocking said I and Q chipstreams respectively into a chain of register stages using a sampling clock equal to said chiprate or a multiple thereof and producing from each stage a delayed I or Q output and its logical inverse complementary output;

first weighting means connected to selected I-outputs or their complementary outputs of said first (I) shift register and a second, identical weighting means connected to the opposite outputs not selected by said first weighting means, said first and second weighting means producing first and second weighted output signals;

third weighting means connected to selected Q-outputs or their complementary outputs of said first (Q) shift register and a fourth, identical weighting means connected to the opposite outputs not selected by said third weighting means, said third and fourth weighting means producing third and fourth weighted output signals; and quadrature modulating means having inputs for receiving said first through fourth weighted output signals for impressing said code division multiple access spread spectrum modulation on a radio frequency signal.

4. A code division multiple access spread spectrum signal transmitter according to claim 3, further comprising:

first smoothing means for smoothing said first and second weighted output signals to produce a first smoothed, balanced signal output;

second smoothing means for smoothing said third and fourth weighted output signals to produce a second smoothed, balanced signal output, wherein said quadrature modulating means having first and second balanced inputs connected respectively to said first and second balanced signal outputs for impressing said code division multiple access spread spectrum modulation on a radio frequency signal.

5. A method of quadrature modulation for impressing a desired modulation on a radio signal, comprising the steps of:

forming an I-signal and a Q-signal representative of a desired radio signal modulation, said I and Q signals each assuming only a single signal value or its complementary value at successive intervals of a sampling clock;

clocking said I and Q signals respectively into a chain of register stages using said sampling clock and producing from each stage a delayed I or Q output and its logical inverse complementary output;

weighting said delayed I output and its logical inverse complementary output to produce first and second weighted output signals;

weighting said delayed Q output and its logical inverse complementary output to produce third and fourth weighted output signals; and impressing said desired modulation on a radio frequency carrier signal in a quadrature modulating means in response to said first through fourth weighted output signals.

6. A method of quadrature modulation according to claim 5, further comprising the steps of:

smoothing said first and second weighted output signals to produce a first smoothed, balanced signal output; and smoothing said third and fourth weighted output signals to produce second smoothed, balanced signal output, wherein said quadrature modulating means has first and second balanced inputs connected respectively to said first and second balanced signal outputs for impressing said desired modulation on a radio frequency carrier signal.

7. A method of code division multiple access spread-spectrum signal transmission, comprising the steps of:

coding a speech or data signal for transmission into a digital signal;

converting said digital signal to an 'I' chipstream and a 'Q' chipstream at a given chiprate, said chipstreams comprising sequences of signal values or their complements;

clocking said I and Q chipstreams respectively into a chain of register stages using a sampling clock equal to said chiprate or a multiple thereof and producing from each stage a delayed I or Q output and its logical inverse complementary output;

weighting said delayed I output and its logical inverse complementary output to produce first and second weighted output signals;

weighting said delayed Q output and its logical inverse complementary output to produce third and fourth weighted output signals; and impressing said code division multiple access spread spectrum modulation on a radio frequency signal in a quadrature modulating means.

8. A method of code division multiple access spread-spectrum signal transmission according to claim 7, further comprising the steps of:

smoothing said first and second weighted output signals to produce a first smoothed, balanced signal output;

smoothing said third and fourth weighted output signals to produce a second smoothed, balanced signal output, wherein said quadrature modulating means having first and second balanced inputs connected respectively to said first and second balanced signal outputs for impressing said code division multiple access spread spectrum modulation on a radio frequency signal.

* * * * *